(12) United States Patent
Hosoya

(10) Patent No.: US 6,805,996 B2
(45) Date of Patent: Oct. 19, 2004

(54) POSITIVE ELECTRODE ACTIVE MATERIAL, NON-AQUEOUS ELECTROLYTE SECONDARY CELL AND METHOD FOR PREPARATION THEREOF

(75) Inventor: Yosuke Hosoya, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/852,495

(22) Filed: May 10, 2001

(65) Prior Publication Data

US 2002/0037456 A1 Mar. 28, 2002

(30) Foreign Application Priority Data

May 11, 2000 (JP) ..................................... P2000-139152

(51) Int. Cl.$^7$ ................................................ H01M 4/00
(52) U.S. Cl. ................... 429/94; 429/231.3; 429/231.1; 429/231.8; 429/231.4; 429/231.95; 429/218.1; 429/231.5; 429/231.6; 429/224; 429/221; 429/330; 429/212; 423/594
(58) Field of Search ........................... 429/231.3, 231.1, 429/231.8, 231.4, 330, 94, 231.95, 218.1, 231.5, 231.6, 224, 221, 212; 423/594

(56) References Cited

U.S. PATENT DOCUMENTS

| | | | | |
|---|---|---|---|---|
| 6,071,645 A | * | 6/2000 | Biensan et al. | 429/223 |
| 6,146,694 A | * | 11/2000 | Reimers et al. | 427/210 |
| 6,274,272 B1 | * | 8/2001 | Peres et al. | 429/231.1 |
| 6,416,904 B1 | * | 7/2002 | Reimers et al. | 429/231.95 |

FOREIGN PATENT DOCUMENTS

| | | |
|---|---|---|
| JP | 10001316 | 1/1998 |
| JP | 2000048818 | 2/2000 |
| WO | WO 98/02928 | 1/1998 |

* cited by examiner

Primary Examiner—Laura Weiner
(74) Attorney, Agent, or Firm—Sonnenschein, Nath & Rosenthal LLP (57) ABSTRACT

A non-aqueous electrolyte cell having improved cyclic characteristics at elevated temperatures. The non-aqueous electrolyte cell includes a positive electrode, a negative electrode and a non-aqueous electrolyte. The positive electrode contains, as a positive electrode active material, a lithium transition metal composite oxide represented by the general formula $LiCo_xA_yB_zO_2$ where A denotes at least one selected from the group consisting of Al, Cr, V, Mn and Fe, B denotes at least one selected from the group consisting of Mg and Ca and x, y and z are such that $0.9 \leq x < 1$, $0.001 \leq y \leq 0.05$ and $0.001 \leq z \leq 0.05$.

11 Claims, 1 Drawing Sheet

FIG.1

POSITIVE ELECTRODE ACTIVE MATERIAL, NON-AQUEOUS ELECTROLYTE SECONDARY CELL AND METHOD FOR PREPARATION THEREOF

RELATED APPLICATION DATA

The present application claims priority to Japanese Application No. P2000-139152 filed May 11, 2000, which application is incorporated herein by reference to the extent permitted by law.

BACKGROUND OF THE INVENTION

This invention relates to a positive electrode active material containing a lithium transition metal composite oxide, a non-aqueous electrolyte cell employing the positive electrode active material, and a method for the preparation thereof.

In keeping up with the recent tendency towards a smaller size and a cordless structure of a variety of electronic equipment, there is raised a strong demand for a higher capacity and a lighter weight of a secondary cell as a driving power source therefor. Since a higher capacity can be achieved with a lithium secondary cell than is possible with a conventional secondary cell, a variety of proposals have been made for a cell which exploits the doping/undoping of lithium ions.

Among the positive electrode active materials for the cell, there are known lithium transition metal composite oxides, such as $LiCoO_2$, $LiNiO_2$, $LiMnO_4$ or $LiFePO_4$. Of these, $LiCoO_2$ is preferentially put to practical use because it has a layered structure which lends itself to diffusion of lithium ions and also because it has a stable structure against doping/undoping of lithium ions. Although $LiNiO_2$ has a layered structure and has merits such as low cost and high capacity, it is subjected to phase changes during lithium ion doping/dedoping which are more severe than those occurring in $LiCoO_2$, such that, when $LiNiO_2$ is used as a positive electrode active material for a lithium ion cell, the layered structure is collapsed with the progress of the charging/discharging cycles, thus leading to the lowered capacity.

As a method for overcoming the above drawback inherent in $LiNiO_2$, such a method has been proposed in which a hetero element is substituted for part of nickel. This method may be exemplified by a method of substituting cobalt or manganese for part of nickel, for stabilizing the layered structure, as disclosed for example in Japanese Patent Laid Open Hei-5-325966 or in Japanese Patent Laid Open Hei-5-299092, and a method of substituting sodium or potassium for part of lithium, for maintaining a lithium layer which has become labile due to lithium doping/dedoping, as disclosed for example in Japanese Patent Laid Open Hei-6-150929.

There has also been researched a method for substituting plural elements for nickel. For example, reports have been made of a method of substituting plural elements selected from the group consisting of cobalt, aluminum, boron and magnesium for nickel to improve charging/discharging cyclic characteristics, as disclosed in Japanese Patent Laid Open Hei-9-92285, and of a method of substituting transition metal elements, such as magnesium, boron or gallium for nickel for improving cyclic characteristics, rate characteristics or cell reliability, as disclosed in Japanese Patent Laid Open Hei-10-208744.

However, since $LiCoO_2$ inherently has a labile layered structure, the lithium ion cell, employing $LiCoO_2$, has cyclic characteristics more favorable than if $LiNiO_2$ is used. So, $LiCoO_2$ has been practically used without the necessity of substitution by hetero atoms. However, with the recent tendency towards higher density and higher temperature of the integrated circuit, the temperature in the equipment is becoming higher, while resistance against environmental factors, required of portable equipment, are becoming stringent. So, for enlarging the usage of a lithium ion cell, it is necessary to improve the resistance against environmental factors of the cell, such as cyclic characteristics under elevated temperatures.

As for substitution of hetero elements in $LiCoO_2$, reports have been made of substituting aluminum, indium or tin for cobalt for improving electronic conductivity, as disclosed in Japanese Patent Laid Open Sho-62-124707, or of substituting boron, bismuth or lead for cobalt, as disclosed in Japanese Patent Laid Open Hei-4-253162.

However, we have found that, when aluminum, indium or tin is substituted for cobalt in $LiCoO_2$, the charging/discharging efficiency or capacity is lowered appreciably, and that, when boron, bismuth or lead is substituted for cobalt, high-temperature storage characteristics are lowered appreciably. So, this substitution cannot but be said to be practically undesirable. On the other hand, there is a statement in the Japanese Patent Laid Open Hei-9-92285 to the effect that, if aluminum or magnesium is substituted for part of $LiCoO_2$, the cyclic characteristics are lowered without being improved.

SUMMARY OF THE INVENTION

It is therefore an object of the present invention to provide a positive electrode active material having improved cyclic characteristics under elevated temperatures, a non-aqueous electrolyte cell employing the positive electrode active material, and a method for the preparation thereof.

In one aspect, the present invention provides a positive electrode active material containing a lithium transition metal composite oxide represented by the general formula $LiCo_xA_yB_zO_2$ where A denotes at least one selected from the group consisting of Al, Cr, V, Mn and Fe, B denotes at least one selected from the group consisting of Mg and Ca and x, y and z are such that $0.9 \leq x < 1$, $0.001 \leq y \leq 0.05$ and $0.001 \leq z \leq 0.05$.

In the positive electrode active material, according to the present invention, which uses a compound as a solid solution of a combination of a first group-consisting of Al, Cr, V, Mn and Fe and a second group consisting of Mg and Ca is substituted for part of Co, not only the stability at ambient temperature but also that at elevated temperatures may be improved.

In another aspect, the present invention provides a non-aqueous electrolyte secondary cell including a positive electrode, a negative electrode and a non-aqueous electrolyte interposed between positive and negative electrodes, in which the positive electrode uses a positive electrode active material containing a lithium transition metal composite oxide represented by the general formula $LiCo_xA_yB_zO_2$ where A denotes at least one selected from the group consisting of Al, Cr, V, Mn and Fe, B denotes at least one selected from the group consisting of Mg and Ca and x, y and z are such that $0.9 \leq x < 1$, $0.001 \leq y \leq 0.05$ and $0.001 \leq z \leq 0.05$.

In the non-aqueous electrolyte cell according to the present invention, in which the positive electrode uses a positive electrode active material in which a combination of a first group consisting of Al, Cr, V, Mn and Fe and a second group consisting of Mg and Ca are substituted for part of Co, not only the stability at ambient temperature but also that at elevated temperatures may be improved. Moreover, the non-aqueous electrolyte cell employing this positive electrode active material is superior in charging/discharging characteristics at elevated temperatures.

In another aspect, the present invention provides a method for the preparation of a positive electrode active material including the steps of mixing a cobalt compound, a lithium compound, a compound of at least one element selected from the group consisting of aluminum, chromium, vanadium, manganese and iron and a compound of at least one element selected from the group consisting of magnesium and calcium, at a pre-set ratio, and sintering a mixture from the mixing step to produce a compound represented by the general formula $LiCo_xA_yB_zO_2$ where A denotes at least one selected from the group consisting of Al, Cr, V, Mn and Fe, B denotes at least one selected from the group consisting of Mg and Ca and x, y and z are such that $0.9 \leq x < 1$, $0.001 \leq y \leq 0.05$ and $0.001 \leq z \leq 0.05$. The compound of at least one element selected from the group selected from the group consisting of magnesium and calcium, as used in the mixing step, is magnesium carbonate or calcium carbonate.

In the method for the preparation of a positive electrode active material, according to the present invention, in which magnesium carbonate or calcium carbonate is used as the magnesium or calcium compound, the positive electrode active material produced is superior in stability.

In another aspect, the present invention provides a method for the preparation of a non-aqueous electrolyte secondary cell including a positive electrode, a negative electrode and a non-aqueous electrolyte interposed between the positive and negative electrodes, including, in producing positive electrode, the steps of mixing a cobalt compound, a lithium compound, a compound of at least one element selected from the group consisting of aluminum, chromium, vanadium, manganese and iron and a compound of at least one element selected from the group consisting of magnesium and calcium, at a pre-set ratio, and sintering a mixture from the mixing step to produce a compound represented by the general formula $LiCo_xA_yB_zO_2$, where A denotes at least one selected from the group consisting of Al, Cr, V, Mn and Fe, B denotes at least one selected from the group consisting of Mg and Ca and x, y and z are such that $0.9 \leq x < 1$, $0.001 \leq y \leq 0.05$ and $0.001 \leq z \leq 0.05$. The compound of at least one element selected from the group consisting of magnesian and calcium, as used in mixing step, is magnesium carbonate or calcium carbonate.

In the method for the preparation of a non-aqueous electrolyte cell, according to the present invention, in which magnesium carbonate or calcium carbonate is used in producing the positive electrode active material as the magnesium or calcium compound, the positive electrode active material is superior in stability, so that the non-aqueous electrolyte cell produced is superior in high-temperature charging/discharging characteristics.

According to the present invention, a lithium transition metal composite oxide represented by the general formula $LiCo_xA_yB_zO_2$ where A denotes at least one selected from the group consisting of Al, Cr, V, Mn and Fe, B denotes at least one selected from the group consisting of Mg and Ca and x, y and z are such that $0.9 \leq x < 1$, $0.001 \leq y \leq 0.05$ and $0.001 \leq z \leq 0.05$, is used as the positive electrode active material, so that a non-aqueous electrolyte cell may be provided in which the positive electrode active material is improved in stability not only at ambient temperature but also at higher temperature and which is superior in high-temperature charging/discharging characteristics.

DESCRIPTION OF THE PREFERRED EMBODIMENTS

Figure 1:
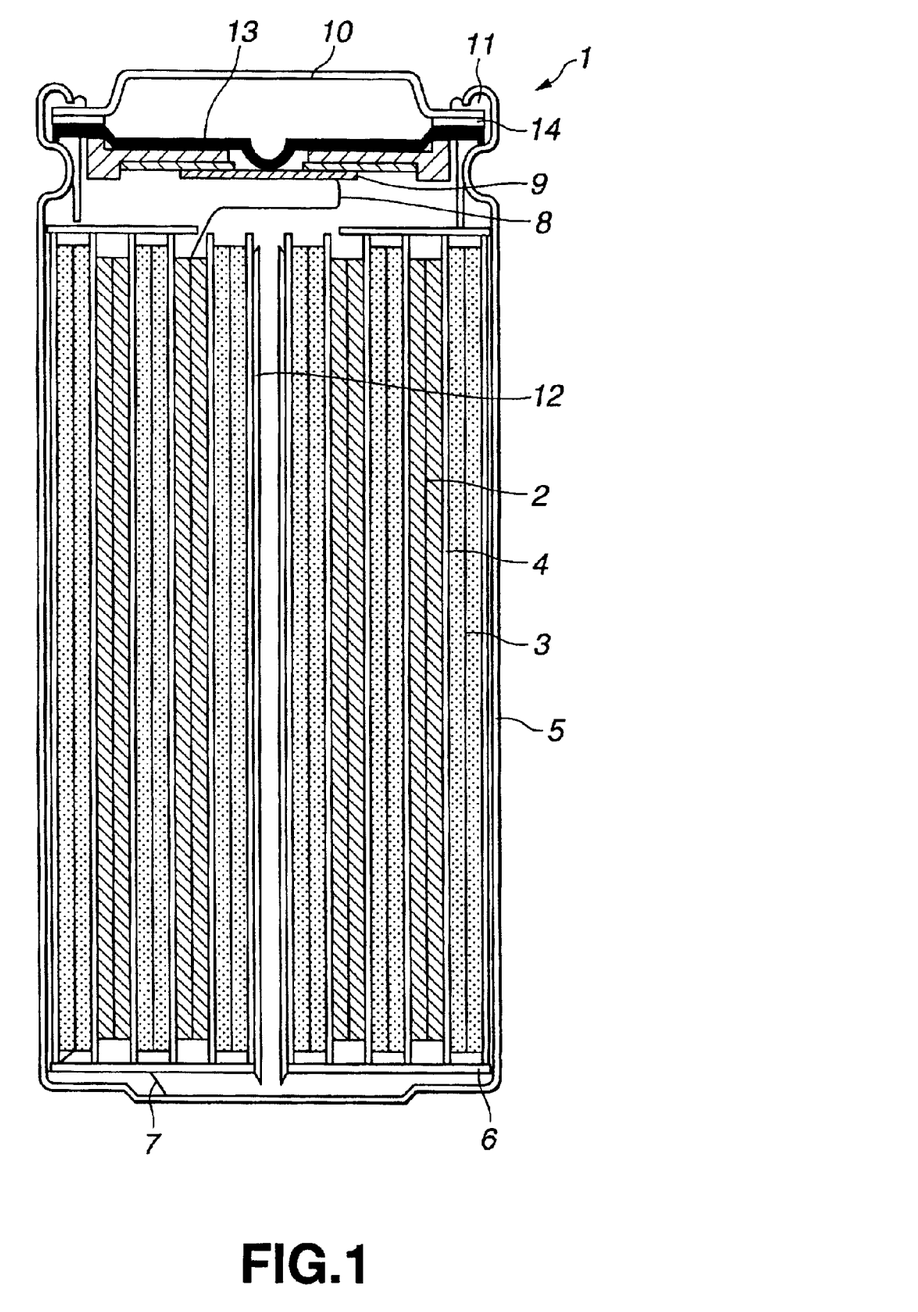
FIG. 1 is a longitudinal cross-sectional view showing an illustrative structure of a non-aqueous electrolyte cell according to the present invention.

Referring to the drawings, preferred embodiments the present invention will be explained in detail.

FIG. 1 is a longitudinal cross-sectional view showing an illustrative structure of a non-aqueous electrolyte cell according to the present invention. In this non-aqueous electrolyte cell 1, a band-shaped positive electrode 2 and a band-shaped negative electrode 3 are coiled in tightly contacting state by interposing a separator 4 to form a coiled set which then is loaded in the inside of a cell can 5.

The positive electrode 2 is fabricated by coating a positive electrode mixture containing a positive electrode active material and a binder on a current collector and drying the resulting produce in situ. The current collector may, for example, be a metal foil, such as an aluminum following.

The non-aqueous electrolyte cell 1 of the present invention uses, as a positive electrode active material, a lithium transition metal composite oxide, represented by a general formula $LiCo_xA_yB_zO_2$, where A denotes at least one selected from the group consisting of Al, Cr, V, Mn and Fe, B denotes at least one selected from the group consisting of Mg and Ca, and x, y and z are such that $0.9 \leq x < 1$, $0.001 \leq y \leq 0.05$ and $0.001 \leq z \leq 0.05$.

The lithium cobalt composite oxide belongs to a hexagonal system represented by the spatial group of R-3m and has a crystalline structure comprised of an orderly layered structure of cobalt, oxygen and lithium layers. However, as the charging progresses, lithium is desorbed from the lithium layer so that the layered structure becomes labile and is collapsed partially. On repeated charging/discharging cycles, that is on repeated lithium doping/undoping, the collapsing of the structure proceeds gradually to induce a decreasing capacity, that is cyclic deterioration. Under a high temperature environment, thermal oscillations of constituent atoms become vigorous to accelerate the above-mentioned collapsing process and hence the cyclic deterioration.

If aluminum or chromium, having a higher bonding energy with respect to oxygen, is substituted for part of cobalt, the structure of the charged state devoid of lithium is reinforced to improve cyclic characteristics. However, since atoms of different properties co-exist in the crystalline system, diffusion of lithium ions in the crystal is obstructed to lower the capacity and the charging/discharging efficiency.

If magnesium or calcium with different valence values is substituted for lithium or cobalt, electronic conductivity is improved, in a known manner, as disclosed e.g., in Solid Ionics 93 (1997) 227. However, if the amount of substitution by magnesium or calcium is increased, not only is the capacity decreased, but also the collapsing of the crystalline structure is promoted.

As a result of out perseverant researches into small-amount substitution by a first group consisting of aluminum, chromium, vanadium, manganese and iron, and by a second group consisting of magnesium and potassium in a lithium/ cobalt compound oxide, the present inventors have found that superior high temperature characteristics are demonstrated if the two groups are used in combination.

That is, according to the present invention, the chemical formula of the positive electrode active material is defined as $LiCo_xA_yB_zO_2$, where A denotes at least one selected from the group consisting of Al, Cr, V, Mn and Fe, B denotes at least one selected from the group consisting of Mg and Ca, and x, y and z are such that $0.9 \leq x \leq 1$, $0.001 \leq y \leq 0.05$ and $0.001 \leq z \leq 0.05$.

If x is smaller than 0.9, the amount of cobalt contributing to charging/discharging is decreased to decrease the capacity. If y is larger than 0.05, the diffusion of lithium ions in the crystal is obstructed to lower the capacity or the charging/discharging efficiency. In order to prevent this from occurring, y is desirably 0.05 or lower, more preferably, 0.03 or lower. On the other hand, if z is larger than 0.05, the capacity decrease and cyclic deterioration proceeds as described above, so that z is preferably 0.05 or less.

The lithium transition metal composite oxide, having the above composition, is improved in stability not only at ambient temperature but also at elevated temperatures. The non-aqueous electrolyte cell 1 of the present invention, employing this lithium transition metal composite oxide, as the positive electrode active material, is superior in charging/discharging characteristics and in cyclic characteristics at elevated temperatures.

As the binder for the positive electrode active material, known binders, used routinely for a positive electrode active material of a cell, may be used. In addition, known additives, such as electrically conductive materials, may be added to the positive electrode active material.

The negative electrode 3 may be prepared by coating a negative electrode mixture, containing a negative electrode active material capable of doping/undoping lithium, and a binder, on a negative electrode current collector, and drying the resulting assembly in situ. As the negative electrode current collector, a foil of a metal that is not alloyed with lithium, may be used. In particular, copper or nickel foils are preferred.

As the negative electrode active material, a carbonaceous material free of lithium and having a large lithium capacity (the amount of lithium that can be doped), alloy materials or polymers, such as polyacetylene, may be used. The carbonaceous material may be exemplified by pyrocarbons, cokes, graphites, vitreous carbon fibers, sintered organic high-polymer compounds, carbon fibers, or carbon materials, such as activated charcoal, capable of lithium doping/undoping. The cokes may be exemplified by pitch coke, needle coke, and petroleum coke. The sintered organic high-polymer compounds denote phenolic or furan resins, sintered at a moderate temperature for carbonization.

The alloy material means a compound represented by the chemical formula $M_xM'_yLi_z$, where M' is one or more element other than the element Li and the element M, x is a number not less than 0 and y, z denote a value not less than 0. The metal elements encompass semiconductor elements, such as B, Si or As. Specified examples of the alloy material include metals Mg, B, Al, Ga, In, Si, Sn, Pb, Sb, Bi, Cd, Ag, Zn, Hf, Zr and Y, alloy compounds thereof, Li—Al, Li—Al—M, where M is one or more selected from the group consisting of 2A, 3A, 3B, 4A, and 4B group transition metal elements, AlSb and CuMgSb.

As elements that can be alloyed with lithium, typical elements of the group 4A, preferably Si or Sn, more preferably Si, are used. Specified examples include compounds represented by MxSi and MxMn, where M denotes one or more metal element excluding Si and Sn, specifically, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$ and $ZnSi_2$.

There may also be contained metal elements other than group 4B, including one or more non-metal elements. Examples of the compounds in this case include SiC, $Si_3N_4$, $Si_2N_2O$, $Ge_2N_2O$, $SiO_x$, where $0 < x \leq 2$, $SnO_x$, where $0 < x \leq 2$, LiSiO and LiSnO.

The negative electrode active material may include two or more of the above-mentioned materials. Lithium doping to the above material may be performed electro-chemically in a cell following the preparation thereof, or by supplying lithium from the positive electrode or from a lithium source other than the positive electrode subsequent or prior to the cell preparation. Alternatively, a lithium-containing material may be prepared at the time of synthesis of the material so that the lithium will be contained in the negative electrode at the time of the cell preparation.

As a binder contained in the layer of the negative electrode active material, any suitable known resin materials, routinely used as a binder for the layer of the negative electrode active material for this sort of the non-aqueous electrolyte cell, may be used. The negative electrode 2 may also be a foil of metal lithium operating as a negative electrode active material.

The separator 4, arranged between the positive electrode 2 and the negative electrode 3, operates to prevent shorting due to physical contact between the positive electrode 2 and the negative electrode 3. The separator 4 may be formed of any suitable known material routinely used as a separator for this sort of the non-aqueous electrolyte cell. For example, the separator 4 may be a micro-porous film of a high molecular material, such as polypropylene. The separator thickness as thin as possible is necessary in view of the relation between lithium ion conductivity and the energy density. Specifically, the thickness of the separator may, for example, be 50 μm or less.

As the non-aqueous electrolytic solution, such a solution obtained on dissolving an electrolyte in a non-protonic non-aqueous solvent is used.

As the non-aqueous solvent, propylene carbonate, ethylene carbonate, butylene carbonate, vinylene carbonate, γ-butyrolactone, sulforane, methyl sulforane, 1,2-dimethoxyethane; 1,2-diethoxyethane, tetrahydrofuran, 2-methyl tetrahydrofuran, 1,3-dioxolane, 4-methyl 1,3-dioxolane, methyl propionate, methyl butyrate, dimethyl carbonate, diethyl carbonate, dipropyl carbonate, diethylether, acetonitrile, propionitrile, anisole, acetic acid esters, lactic acid esters and propionic acid esters, may be used. In particular, cyclic carbonates, such as propylene carbonate or vinylene carbonate, or chained carbonates, such as dimethyl carbonate, diethyl carbonate or dipropyl carbonate, are preferably used in view of voltage stability. The non-aqueous solvents may be used one or more as a mixture.

As the electrolytes dissolved in a non-aqueous solvent, lithium salts, such as LiCl, LiBr, $LiPF_6$, $LiClO_4$, $LiAsF_6$, $LiBF_4$, $LiCH_3SO_3$, $LiCF_3SO_3$, $LiN(CF_3SO_2)_2$ or $LiB(C_6H_5)_4$, may be used. Of these lithium salts, $LiPF_6$ and $LiBF_4$ are preferred.

The non-aqueous electrolyte cell 1 of the present invention uses, as the positive electrode active material, a lithium transition metal composite oxide represented by the general formula $LiCo_xA_yB_zO_2$, where A denotes at least one selected from the group consisting of Al, Cr, V, Mn and Fe, B denotes at least one selected from the group consisting of Mg and Ca, and x, y and z are such that $0.9 \leq x < 1$, $0.001 \leq y \leq 0.05$ and $0.001 \leq z \leq 0.05$. So, the positive electrode active material is improved in stability not only at ambient temperature but also at elevated temperature, so that the non-aqueous electrolyte cell 1 is superior in stability and charging/discharging characteristics at elevated temperatures.

The non-aqueous electrolyte cell 1, employing the positive electrode active material; is prepared is prepared e.g., as now explained.

First, a positive electrode active material according to the present invention is synthesized as follows:

The positive electrode active material, employing a lithium transition metal composite oxide represented by the general formula $LiCo_xA_yB_zO_2$, where A denotes at least one selected from the group consisting of Al, Cr, V, Mn and Fe, B denotes at least one selected from the group consisting of Mg and Ca, is obtained on mixing a cobalt compound, a lithium compound, a compound of elements selected from the group of aluminum, chromium, vanadium, manganese and iron, and a compound of magnesium or calcium, in a pre-set ratio, and on firing the resulting mixture. There is no particular limitation to the firing temperature or to the firing time.

Specifically, x, y and z in the above formula are preferably such that $0.9 \leq x < 1$, $0.001 \leq y \leq 0.05$ and $0.001 \leq z \leq 0.05$.

As the above cobalt compounds, inorganic salts, such as cobalt carbonate or cobalt sulfate, oxides, such as cobalt oxide or hydroxides, may be used without limitations. The lithium compounds and the compounds of elements selected from the group consisting of aluminum, chromium, vanadium, manganese and iron may similarly be inorganic salts, oxides or hydroxides.

As for magnesium or calcium compounds, inorganic salts, oxides or hydroxides, may similarly be used. It is however preferred to use inorganic salts in order for magnesium or calcium atoms to be optimally dispersed and solid-dissolved in crystals. So, carbonates, such as magnesium carbonate or calcium carbonate, are preferably used as magnesium or calcium source in view of high reactivity.

The positive electrode 2 is prepared by evenly coating a positive electrode mixture, containing the positive electrode active material, prepared as described above, and a binder, on a metal foil, such as aluminum foil, operating as a positive electrode current collector, and drying the resulting assembly in situ to form a layer of the positive electrode. active material. As the binder for the positive electrode mixture, any suitable known binder may be used. In addition, any known suitable additive may be added to the positive electrode mixture.

The negative electrode 3 is prepared by evenly coating a positive electrode mixture, containing a negative electrode active material and a binder, on a metal foil, such as copper foil, operating as a negative electrode current collector, and drying the resulting assembly in situ to form a layer of the positive electrode active material. As the binder for the negative electrode mixture, any suitable known binder may be used. In addition, any known suitable additive may be added to the positive electrode mixture.

The positive electrode 2 and the negative electrode 3, prepared as described above, are tightly contacted with each other, via e.g., a separator 4 of a micro-porous polypropylene film, in between, and coiled spirally a number of turns to complete a coiled assembly.

An insulating plate 6 is then inserted on a bottom surface of a nickel-plated iron cell can 5, the inner surface of which is coated with nickel, and the coiled assembly is set therein. For assuring current collection of the negative electrode, one end of a negative electrode lead 7 of nickel is press-fitted to the negative electrode 3, with the other end thereof being welded to the cell can 5. This electrically connects the cell can 5 to the negative electrode 3, with the cell can 5 then serving as an external negative electrode of the non-aqueous electrolyte cell 1. For assuring current collection of the positive electrode, one end of a positive electrode lead 8 of e.g., aluminum is press-fitted to the positive electrode 2, with the other end thereof being welded to a cell lid 10 via a current breaking thin sheet The current breaking thin sheet 9 breaks the current depending on an internal pressure in the cell. This electrically connects the cell lid 10 to the positive electrode 2, with the cell lid 10 then serving as an external negative electrode of the non-aqueous electrolyte cell 1.

The non-aqueous electrolytic solution then is charged into the cell can 5. The non-aqueous electrolytic solution is prepared on dissolving the electrolyte in a non-aqueous solvent.

The cell can 5 is then caulked via an insulating sealing gasket 11 coated with asphalt to immobilize the cell lid 10 to complete the cylindrically-shaped non-aqueous electrolyte cell 1.

Referring to FIG. 1, this non-aqueous electrolyte cell 1 includes a center pin 12 for connecting to the negative electrode lead 7 and to the positive electrode lead 8. The non-aqueous electrolyte cell 1 also includes a safety valve device 13 for exhausting the inner gas when the pressure in the cell exceeds a pre-set value and a PTC element 14 for preventing temperature rise in the cell.

In the foregoing explanation, the non-aqueous electrolyte cell 1 employing the non-aqueous electrolytic solution is taken as an example of the non-aqueous cell. The structure of the non-aqueous cell according to the present invention is, however, not limited to the above-described structure and may be applied to such a non-aqueous cell employing, as a non-aqueous electrolyte, a solid electrolyte or a solid electrolyte in which the non-aqueous electrolytic solution is gelated by a matrix polymer.

The solid electrolyte used may be an inorganic solid electrolyte or a high molecular solid electrolyte, provided that the electrolyte is formed of a material exhibiting lithium ion conductivity. The inorganic solid electrolyte may, for example, be lithium nitride or lithium iodide. The high molecular solid electrolyte is composed of an electrolytic salt and a high molecular compound for dispersing the electrolytic salt therein. The high molecular compound may be ether-based high molecular materials, such as cross-linked or non-cross-linked poly(ethylene oxide), poly (methacrylate) ester-based high molecular materials or acrylate-based high molecular materials, used singly or co-polymerized or mixed into a molecule.

As the matrix polymer used in the gelated solid electrolyte, a variety of high molecular materials may be used, provided that the polymer is gelated as it absorbs the above-mentioned non-aqueous electrolyte. For example, fluorine-based high molecular materials, such as poly (vinylidene fluoride), poly(vinylidene fluoride-co-hexafluoropropylene), ether-based high molecular materials, such as cross-linked or non-cross-linked poly(ethylene oxide) or poly(acrylonitrile), may be used. In particular, the fluorine-based high molecular materials are preferred in view of redox stability.

In the above-described description of the preferred embodiment, a secondary cell is taken as an example.

However, the present invention is not limited thereto such that it may also be applied to a primary cell. The cell of the present invention is not particularly limited to the shape of the cell, such as cylinder, square shape, coin shape, button shape or a laminate seal, while it may be of any suitable size or shape, such as a thin type or a large size type.

EXAMPLES

The present invention is hereinafter explained with reference to Examples and Comparative Examples for confirming the effect of the present invention.

Examinations into the Amount of Substitution of Aluminum

In the following samples 1 to 8, non-aqueous electrolyte cells were prepared, using a lithium transition metal composite oxide, with substitution of part of Co by Al and Mg, as a positive electrode active material, as the Al ratio was varied, and evaluation was made of characteristics of the cells thus produced.

Sample 1

First, commercially available lithium carbonate, aluminum hydroxide and magnesium carbonate were mixed at a Li:Co:Al:Mg molar ratio of 1.02:0.989:0.001:0.01. The resulting mixture was charged into an alumina crucible and sintered in a dry atmosphere. The powders produced were quantitatively analyzed by an atomic absorption analysis and, by this analysis, the composition was identified to be $LiCo_{0.989}Al_{0.001}Mg_{0.01}O_2$. The powders were also put to X-ray diffractometry, as a result of which the pattern produced was confirmed to be analogous to a pattern of $LiCoO_2$, in 36-1004 of International Centre For Diffraction Data (ICCD), with the powders forming a layered structure similar to that of $LiCoO_2$, 86 wt % of the positive electrode active material, prepared as described above, 10 wt % of graphite, as an electrically conductive agent and 4 wt % of polyvinylidene fluoride (PVdF), as a binder, were mixed together and dispersed in N-methyl-2-pyrrolidone (NMP) to form a slurry of the positive electrode mixture. This slurry was uniformly coated on both surfaces of a strip-shaped aluminum foil, 20 μm in thickness, and dried in situ. The resulting product was compressed by a roll press to produce a strip-shaped positive electrode. The packing density of this positive electrode was measured and found to be 3.2 g/cm³.

For preparing a negative electrode, 10 wt % of PVdF were mixed to 90 wt % of particulate artificial graphite. The resulting mixture was dispersed in NMP to form a negative electrode mixture slurry, which then was evenly coated on both surfaces of a copper foil, 10 μm in thickness. The resulting product was dried and compressed by a roll press to form a strip-shaped negative electrode.

The band-shaped positive and negative electrodes, prepared as described above, were stacked with each other, by interposing a micro-porous polypropylene film in between, and wound spirally a number of turns to complete a coiled electrode unit. This electrode unit was accommodated in a nickel-plated iron cell can and insulating plates was placed on each of the upper and lower surfaces of the electrode unit. A positive electrode lead of aluminum was led out from the positive electrode current collector and welded to a protrusion of a safety valve electrically connected to the cell lid, whilst a negative electrode lead of nickel was led out from the negative electrode current collector and welded to the bottom of the cell can.

As for the electrolytic solution, $LiPF_6$ was added in a concentration of 1 mol/cm³ in a mixed solution of ethylene carbonate and methylethyl carbonate at a volumetric mixing ratio of 1:1, to prepare a non-aqueous electrolyte solution.

Finally, an electrolytic solution was infused into a cell case, in which is assembled the above-mentioned electrode unit. The cell can was then caulked via an insulating sealing gasket to secure the safety valve, PTC element and the cell lid to form a cylindrically-shaped non-aqueous electrolyte cell with an outer diameter of 18 mm and a height of 655 mm.

Sample 2

$LiCo_{0.98}Al_{0.01}Mg_{0.01}O_2$ was synthesized in the same way as sample 1, except mixing lithium carbonate, cobalt oxide, aluminum hydroxide and magnesium carbonate to a Li:Co:Al:Mg molar ratio of 1.02:0.98:0.01:0.01.

Using this $LiCo_{0.98}Al_{0.01}Mg_{0.01}O_2$ as the positive electrode active material, a cylindrically-shaped non-aqueous electrolyte cell was prepared in the same way as sample 1.

Sample 3

$LiCo_{0.96}Al_{0.03}Mg_{0.01}O_2$ was synthesized in the same way as sample 1, except mixing lithium carbonate, cobalt oxide, aluminum hydroxide and magnesium carbonate to a Li:Co:Al:Mg molar ratio of 1.02:0.96:0.03:0.01.

Using this $LiCo_{0.96}Al_{0.03}Mg_{0.01}O_2$ as the positive electrode active material, a cylindrically-shaped non-aqueous electrolyte cell was prepared in the same way as sample 1.

Sample 4

$LiCo_{0.94}Al_{0.5}Mg_{0.01}O_2$ was synthesized in the same way as sample 1, except mixing lithium carbonate, cobalt oxide, aluminum hydroxide and magnesium carbonate to a Li:Co:Al:Mg molar ratio of 1.02:0.94:0.05:0.01.

Using this $LiCo_{0.94}Al_{0.05}Mg_{0.01}O_2$ as the positive electrode active material, a cylindrically-shaped non-aqueous electrolyte cell was prepared in the same way as sample 1.

Sample 5

$LiCo_{0.92}Al_{0.07}Mg_{0.01}O_2$ was synthesized in the same way as sample 1, except mixing lithium carbonate, cobalt oxide, aluminum hydroxide and magnesium carbonate to a Li:Co:Al:Mg molar ratio of 1.02:0.92:0.07:0.01.

Using this $LiCo_{0.92}Al_{0.7}Mg_{0.01}O_2$ as the positive electrode active material, a cylindrically-shaped non-aqueous electrolyte cell was prepared in the same way as sample 1.

Sample 6

$LiCo_{0.89}Al_{0.1}Mg_{0.01}O_2$ was synthesized in the same way as sample 1, except mixing lithium carbonate, cobalt oxide, aluminum hydroxide and magnesium carbonate to Li:Co:Al:Mg molar ratio of 1.02:0.89:0.1:0.01.

Using this $LiCo_{0.89}Al_{0.1}Mg_{0.01}O_2$ as the positive electrode active material, a cylindrically-shaped non-aqueous electrolyte cell was prepared in the same way as sample 1.

Sample 7

$LiCo_{0.99}Mg_{0.01}O_2$ was synthesized in the same way as sample 1 except mixing lithium carbonate, cobalt oxide and magnesium carbonate at a Li:Co:Mg molar ratio of 1.02:0.99:0.01, without using aluminum hydroxide.

Using this $LiCo_{0.99}Mg_{0.01}O_2$ as the positive electrode active material, a cylindrically-shaped non-aqueous electrolyte cell was prepared in the same way as sample 1.

Sample 8

$LiCoO_2$ was synthesized in the same way as sample 1 except mixing lithium carbonate and cobalt oxide at a Li:Co molar ratio of 1.02:1.0, without using aluminum hydroxide nor magnesium carbonate.

Using this $LiCoO_2$ as the positive electrode active material, a cylindrically-shaped non-aqueous electrolyte cell was prepared in the same way as sample 1.

The non-aqueous electrolyte cells of samples 1 to 8, prepared as described above, were charged under the conditions of the environmental temperature of 23° C., charging voltage of 4.20V, charging current of 1000 mA and the charging time of 2.5 hours, and discharged under the condition of the discharging current of 1500 mA and a terminal voltage of 2.75V, to examine an initial capacity (initial discharging capacity). The initial efficiency was also found as a ratio of the initial discharging capacity to the initial charging capacity. The charging/discharging was repeated under the same conditions, and 100th cycle discharging capacity was measured to find the volumetric upkeep ratio with respect to the initial capacity. Similar measurement were also conducted under an environment of 60° C.

The initial capacity, initial efficiency and the 100 cycle volumetric upkeep ratio at 23° C. and at 50° C. for the samples 1 to 8 are shown along with the proportions of the Al and Mg in Table 1:

TABLE 1

| | Al | Mg | initial capacity (mAh) | initial efficiency (%) | volumetric upkeep ratio at 23° C. 100 cycles (%) | volumetric upkeep ratio at 50° C. 100 cycles (%) |
|---|---|---|---|---|---|---|
| sample 1 | 0.001 | 0.010 | 1720 | 95.0 | 94.0 | 75.4 |
| sample 2 | 0.010 | 0.010 | 1700 | 95.0 | 95.3 | 81.8 |
| sample 3 | 0.030 | 0.010 | 1680 | 95.2 | 95.5 | 82.2 |
| sample 4 | 0.030 | 0.010 | 1690 | 94.9 | 94.4 | 82.0 |
| sample 5 | 0.070 | 0.010 | 1590 | 90.3 | 93.0 | 73.1 |
| sample 6 | 0.100 | 0.010 | 1470 | 85.5 | 92.2 | 64.9 |
| sample 7 | 0.000 | 0.010 | 1710 | 95.1 | 92.5 | 65.8 |
| sample 8 | 0.000 | 0.000 | 1710 | 95.0 | 93.2 | 72.1 |

In the sample 7, in which only Mg is substituted for part of Co, the volumetric upkeep ratio was lowered in comparison with that in the sample 8 without substitution for Co, whereas, in the samples 1 to 4 in which Al and Mg are substituted for part of Co, the volumetric upkeep ratio is improved, thus indicating improvement in cyclic characteristics at ambient and elevate temperatures. However, in the samples 5 and 6 in which the proportion of Al exceeds 0.05, not only the initial charging/discharging efficiency but also the cyclic characteristics are lowered. Thus it is seen that the amount of addition y of Al such that $0.001 \leq y \leq 0.05$ is desirable.

Examination for the Amount of Substitution of Magnesium

In the following samples 9 to 14, non-aqueous electrolyte cells were prepared, using, as a positive electrode active material, a lithium transition metal composite oxide in which Al and Mg are substituted for part of Co and in which the proportion of Mg is varied, and evaluation was made of characteristics of the cells thus produced.

Sample 9

$LiCo_{0.989}Al_{0.01}Mg_{0.001}O_2$ was synthesized in the same way as sample 1, except mixing lithium carbonate, cobalt oxide, aluminum hydroxide and magnesium carbonate to a Li:Co:Al:Mg molar ratio of 1.02:0.989:0.01:0.001.

Using this $LiCo_{0.989}Al_{0.01}Mg_{0.001}O_2$ as the positive electrode active material, a cylindrically-shaped non-aqueous electrolyte cell was prepared in the same way as sample 1.

Sample 10

$LiCo_{0.96}Al_{0.01}Mg_{0.03}O_2$ was synthesized in the same way as sample 1, except mixing lithium carbonate, cobalt oxide, aluminum hydroxide and magnesium carbonate to a Li:Co:Al:Mg molar ratio of 1.02:0.96:0.01:0.03.

Using this $LiCo_{0.96}Al_{0.01}Mg_{0.03}O_2$ as the positive electrode active material, a cylindrically-shaped non-aqueous electrolyte cell was prepared in the same way as sample 1.

Sample 11

$LiCo_{0.94}Al_{0.01}Mg_{0.05}O_2$ was synthesized in the same way as sample 1, except mixing lithium carbonate, cobalt oxide, aluminum hydroxide and magnesium carbonate to a Li:Co:Al:Mg molar ratio of 1.02:0.94:0.01:0.05.

Using this $LiCo_{0.94}Al_{0.01}Mg_{0.05}O_2$ as the positive electrode active material, a cylindrically-shaped non-aqueous electrolyte cell was prepared in the same way as sample 1.

Sample 12

$LiCo_{0.92}Al_{0.01}Mg_{0.07}O_2$ was synthesized in the same way as sample 1, except mixing lithium carbonate, cobalt oxide, aluminum hydroxide and magnesium carbonate to a Li:Co:Al:Mg molar ratio of 1.02:0.92:0.01:0.07.

Using this $LiCo_{0.92}Al_{0.01}Mg_{0.07}O_2$ as the positive electrode active material, a cylindrically-shaped non-aqueous electrolyte cell was prepared in the same way as sample 1.

Sample 13

$LiCo_{0.89}Al_{0.01}Mg_{0.1}O_2$ was synthesized in the same way as sample 1, except mixing lithium carbonate, cobalt oxide, aluminum hydroxide and magnesium carbonate to a Li:Co:Al:Mg molar ratio of 1.02:0.89:0.01:0.1.

Using this $LiCo_{0.89}Al_{0.01}Mg_{0.1}O_2$ as the positive electrode active material, a cylindrically-shaped non-aqueous electrolyte cell was prepared in the same way as sample 1.

Sample 14

$LiCo_{0.99}Al_{0.01}O_2$ was synthesized in the same way as sample 1 except mixing lithium carbonate, cobalt oxide and aluminum hydroxide at a Li:Co:Al molar ratio of 1.02:0.99:0.1, without using magnesium carbonate.

Using this $LiCo_{0.99}Al_{0.01}O_2$ as the positive electrode active material, a cylindrically-shaped non-aqueous electrolyte cell was prepared in the same way as sample 1.

The initial capacity, initial efficiency and the 100 cycle volumetric upkeep ratio at 23° C. and at 50° C. for the samples 9 to 14 are shown along with the proportions of the Al and Mg in Table 2:

TABLE 2

| | Al | Mg | initial capacity (mAh) | initial efficiency (%) | volumetric upkeep ratio (%) at 23° C. 100 cycles | volumetric upkeep ratio (%) at 50° C. 100 cycles |
|---|---|---|---|---|---|---|
| sample 9 | 0.010 | 0.001 | 1690 | 95.3 | 95.1 | 78.9 |
| sample 2 | 0.010 | 0.010 | 1700 | 95.0 | 95.3 | 81.8 |
| sample 10 | 0.010 | 0.030 | 1720 | 95.2 | 95.4 | 80.5 |
| sample 11 | 0.010 | 0.050 | 1710 | 95.1 | 94.4 | 77.2 |
| sample 12 | 0.010 | 0.070 | 1700 | 95.1 | 90.1 | 69.1 |
| sample 13 | 0.010 | 0.100 | 1710 | 94.9 | 64.3 | 63.3 |
| sample 14 | 0.010 | 0.000 | 1700 | 94.8 | 93.0 | 71.5 |
| sample 8 | 0.000 | 0.000 | 1700 | 95.0 | 93.2 | 72.1 |

In the above Table 2, the results of evaluation of samples 2 and 8 are also shown.

In the sample 14, in which only Mg is substituted for part of Co, the volumetric upkeep ratio was lowered in comparison with that in the sample 8 with no substitution for Co. However, in the samples 2 and samples 9 to 11 in which Al and Mg are substituted for part of Co, the volumetric upkeep ratio is improved, thus indicating improvement in cyclic characteristics at ambient and elevate temperatures. However, in the samples 12 and 13 in which the proportion of Al exceeds 0.05, not only the initial charging/discharging efficiency but also the cyclic characteristics are lowered. Thus it is seen that the amount of addition y of Al such that $0.001 \leq y \leq 0.05$ is desirable.

Examination for Chromium Amount

In the following samples 15 to 20, non-aqueous electrolyte cells were prepared, using, as a positive electrode active material, a lithium transition metal composite oxide in which Cr and Mg are substituted for part of Co, and in which the proportion of Mg is varied, and evaluation was made of characteristics of the cells thus produced.

Sample 15

$LiCo_{0.989}Cr_{0.01}Mg_{0.01}O_2$ was synthesized in the same way as sample 1, except using chromium oxide in place of aluminum hydroxide and mixing lithium carbonate, cobalt oxide, chromium oxide and magnesium carbonate to a Li:Co:Cr:Mg molar ratio of 1.02:0.989:0.001:0.01.

Using this $LiCo_{0.989}Cr_{0.001}Mg_{0.01}O_2$ as the positive electrode active material, a cylindrically-shaped non-aqueous electrolyte cell was prepared in the same way as sample 1.

Sample 16

$LiCo_{0.98}Cr_{0.01}Mg_{0.01}O_2$ was synthesized in the same way as sample 1, except using chromium oxide in place of aluminum hydroxide and mixing lithium carbonate, cobalt oxide, chromium oxide and magnesium carbonate to a Li:Co:Cr:Mg molar ratio of 1.02:0.98:0.01:0.01.

Using this $LiCo_{0.98}Cr_{0.01}Mg_{0.01}O_2$ as the positive electrode active material, a cylindrically-shaped non-aqueous electrolyte cell was prepared in the same way as sample 1.

Sample 17

$LiCo_{0.96}Cr_{0.03}Mg_{0.01}O_2$ was synthesized in the same way as sample 1, except using chromium oxide in place of aluminum hydroxide and mixing lithium carbonate, cobalt oxide, chromium oxide and magnesium carbonate to a Li:Co:Cr:Mg molar ratio of 1.02:0.96:0.03:0.01.

Using this $LiCo_{0.96}Cr_{0.03}Mg_{0.01}O_2$ as the positive electrode active material, a cylindrically-shaped non-aqueous electrolyte cell was prepared in the same way as sample 1.

Sample 18

$LiCo_{0.94}Cr_{0.05}Mg_{0.01}O_2$ was synthesized in the same way as sample 1, except using chromium oxide in place of aluminum hydroxide and mixing lithium carbonate, cobalt oxide, chromium oxide and magnesium carbonate to a Li:Co:Cr:Mg molar ratio of 1.02:0.94:0.05:0.01.

Using this $LiCo_{0.94}Cr_{0.05}Mg_{0.01}O_2$ as the positive electrode active material, a cylindrically-shaped non-aqueous electrolyte cell was prepared in the same way as sample 1.

Sample 19

$LiCo_{0.92}Cr_{0.07}Mg_{0.01}O_2$ was synthesized in the same way as sample 1, except using chromium oxide in place of aluminum hydroxide and mixing lithium carbonate, cobalt oxide, chromium oxide and magnesium carbonate to a Li:Co:Cr:Mg molar ratio of 1.02:0.92:0.07:0.01.

Using this $LiCo_{0.92}Cr_{0.07}Mg_{0.01}O_2$ as the positive electrode active material, a cylindrically-shaped non-aqueous electrolyte cell was prepared in the same way as sample 1.

Sample 20

$LiCo_{0.89}Cr_{0.1}Mg_{0.01}O_2$ was synthesized in the same way as sample 1, except using chromium oxide in place of aluminum hydroxide and mixing lithium carbonate, cobalt oxide, chromium oxide and magnesium carbonate to a Li:Co:Cr:Mg molar ratio of 1.02:0.89:0.1:0.01.

Using this $LiCo_{0.89}Cr_{0.1}Mg_{0.01}O_2$ as the positive electrode active material, a cylindrically-shaped non-aqueous electrolyte cell was prepared in the same way as sample 1.

The initial capacity, initial efficiency and the 100 cycle volumetric upkeep ratio at 23° C. and at 50° C. for the samples 15 to 20 are shown along with the proportions of the Cr and Mg in Table 3:

TABLE 3

| | Cr | Mg | initial capacity (mAh) | initial efficiency (%) | volumetric upkeep ratio at 23° C. 100 cycles (%) | volumetric upkeep ratio at 50° C. 100 cycles (%) |
|---|---|---|---|---|---|---|
| sample 7 | 0.000 | 0.010 | 1710 | 95.1 | 92.5 | 65.8 |
| sample 15 | 0.001 | 0.010 | 1710 | 95.1 | 93.8 | 75.5 |
| sample 16 | 0.010 | 0.010 | 1720 | 94.8 | 95.1 | 80.0 |
| sample 17 | 0.030 | 0.010 | 1670 | 94.6 | 95.0 | 81.1 |
| sample 18 | 0.050 | 0.010 | 1680 | 94.5 | 94.2 | 80.5 |
| sample 19 | 0.070 | 0.010 | 1580 | 88.1 | 92.3 | 70.2 |
| sample 20 | 0.100 | 0.010 | 1440 | 83.3 | 90.9 | 62.2 |
| sample 8 | 0.000 | 0.000 | 1710 | 95.0 | 93.2 | 72.1 |

In the above Table 2, the results of evaluation of samples 7 and 8 are also shown.

In the sample 7, in which only Mg is substituted for part of Co, the volumetric upkeep ratio was lowered in comparison with that in the sample 8 with no substitution for Co. On the other hand, in the samples 15 to 18 in which Cr and Mg are substituted for part of Co, the volumetric upkeep ratio is improved, thus testifying to improvement in cyclic characteristics at ambient and elevated temperatures. However, in the samples 19 and 20 in which the proportion of Cr exceeds 0.05, the initial charging/discharging efficiency is lowered. Thus it is seen that the amount of addition z of Cr such that $0.001 \leq z \leq 0.05$ is desirable.

Examination for Calcium Amount

In the following samples 21 to 26, non-aqueous electrolyte cells were prepared, using, as a positive electrode active material, a lithium transition metal composite oxide in which Al and Ca are substituted for part of Co, as the proportion of Ca was varied, and evaluation was made of characteristics of the cells thus produced.

Sample 21

$LiCo_{0.989}Al_{0.01}Ca_{0.001}O_2$ was synthesized in the same way as sample 1, except using calcium carbonate in place of magnesium carbonate and mixing lithium carbonate, cobalt oxide, aluminum oxide and calcium carbonate to a Li:Co:Al:Ca molar ratio of 1.02:0.989:0.01:0.001.

Using this $LiCo_{0.989}Al_{0.01}Ca_{0.001}O_2$ as the positive electrode active material, a cylindrically-shaped non-aqueous electrolyte cell was prepared in the same way as sample 1.

Sample 22

$LiCo_{0.98}Al_{0.01}Ca_{0.01}O_2$ was synthesized in the same way as sample 1, except using calcium carbonate in place of magnesium carbonate and mixing lithium carbonate, cobalt oxide, aluminum oxide and calcium carbonate to a Li:Co:Al:Ca molar ratio of 1.02:0.98:0.01:0.01.

Using this $LiCo_{0.98}Al_{0.01}Ca_{0.01}O_2$ as the positive electrode active material, a cylindrically-shaped non-aqueous electrolyte cell was prepared in the same way as sample 1.

Sample 23

$LiCo_{0.96}A_{0.01}Ca_{0.03}O_2$ was synthesized in the same way as sample 1, except using calcium carbonate in place of magnesium carbonate and mixing lithium carbonate, cobalt oxide, aluminum oxide and calcium carbonate to a Li:Co:Al:Ca molar ratio of 1.02:0.96:0.01:0.03.

Using this $LiCo_{0.96}Al_{0.01}Ca_{0.03}O_2$ as the positive electrode active material, a cylindrically-shaped non-aqueous electrolyte cell was prepared in the same way as sample 1.

Sample 24

$LiCo_{0.94}Al_{0.01}Ca_{0.05}O_2$ was synthesized in the same way as sample 1, except using calcium carbonate in place of magnesium carbonate and mixing lithium carbonate, cobalt oxide, aluminum oxide and calcium carbonate to a Li:Co:Al:Ca molar ratio of 1.02:0.94:0.01:0.05.

Using this $LiCo_{0.94}Al_{0.01}Ca_{0.05}O_2$ as the positive electrode active material, a cylindrically-shaped non-aqueous electrolyte cell was prepared in the same way as sample 1.

Sample 25

$LiCo_{0.92}Al_{0.01}Ca_{0.07}O_2$ was synthesized in the same way as sample 1, except using calcium carbonate in place of magnesium carbonate and mixing lithium carbonate, cobalt oxide, aluminum oxide and calcium carbonate to a Li:Co:Al:Ca molar ratio of 1.02:0.92:0.01:0.007.

Using this $LiCo_{0.92}Al_{0.01}Ca_{0.07}O_2$ as the positive electrode active material, a cylindrically-shaped non-aqueous electrolyte cell was prepared in the same way as sample 1.

Sample 26

$LiCo_{0.89}Al_{0.01}Ca_{0.1}O_2$ was synthesized in the same way as sample 1, except using calcium carbonate in place of magnesium carbonate and mixing lithium carbonate, cobalt oxide, aluminum oxide and calcium carbonate to a Li:Co:Al:Ca molar ratio of 1.02:0.89:0.01:0.1.

Using this $LiCo_{0.89}Al_{0.01}Ca_{0.1}O_2$ as the positive electrode active material, a cylindrically-shaped non-aqueous electrolyte cell was prepared in the same way as sample 1.

The initial capacity, initial efficiency and the 100 cycle volumetric upkeep ratio at 23° C. and at 50° C. for the samples 21 to 26 are shown along with the proportions of the Cr and Mg in Table 4:

TABLE 4

|  | Al | Ca | initial capacity (mAh) | initial efficiency (%) | volumetric upkeep ratio at 23° C. 100 cycles (%) | volumetric upkeep ratio at 50° C. 100 cycles (%) |
| --- | --- | --- | --- | --- | --- | --- |
| sample 14 | 0.010 | 0.000 | 1700 | 94.8 | 93.0 | 71.5 |
| sample 21 | 0.010 | 0.001 | 1710 | 95.1 | 95.2 | 78.5 |
| sample 22 | 0.010 | 0.010 | 1680 | 94.9 | 95.1 | 80.2 |
| sample 23 | 0.010 | 0.030 | 1690 | 94.8 | 95.5 | 81.1 |
| sample 24 | 0.010 | 0.050 | 1670 | 94.6 | 94.4 | 76.4 |
| sample 25 | 0.010 | 0.070 | 1660 | 94.5 | 89.3 | 67.8 |
| sample 26 | 0.010 | 0.100 | 1660 | 94.6 | 82.1 | 60.4 |
| sample 8 | 0.000 | 0.000 | 1710 | 95.0 | 93.2 | 72.1 |

In the above Table 4, the results of evaluation of samples 8 and 14 are also shown.

In the sample 14, in which only Al is substituted for part of Co, the volumetric upkeep ratio was lowered in comparison with that in the sample 8 with no substitution for Co. In the samples 21 to 24 in which Al and Ca are substituted for part of Co, the volumetric upkeep ratio is improved, thus testifying to improvement in cyclic characteristics at ambient and elevated temperatures. However, in the samples 25 and 26 in which the proportion of Ca exceeds 0.05, the cyclic characteristics are lowered, even though the initial charging/discharging efficiency is not lowered. Thus it is seen that the amount of addition z of Ca such that $0.001 \leq z \leq 0.05$ is desirable.

Examination for Various Substitution Elements

In the following samples 27 to 29, non-aqueous electrolyte cells were prepared, using, as a positive electrode active material, a lithium transition metal composite oxide in which Al, Cr, V, Mn or Fe and Mg are substituted for part of Co, and evaluation was made of characteristics of the cells thus produced.

Sample 27

$LiCo_{0.98}V_{0.01}Mg_{0.01}O_2$ was synthesized in the same way as sample 1, except using vanadium oxide in place of aluminum oxide and mixing lithium carbonate, cobalt oxide, vanadium oxide and magnesium carbonate to a Li:Co:V:Mg molar ratio of 1.02:0.98:0.01:0.01.

Using this $LiCo_{0.98}V_{0.01}Mg_{0.01}O_2$ as the positive electrode active material, a cylindrically-shaped non-aqueous electrolyte cell was prepared in the same way as sample 1.

Sample 28

$LiCo_{0.98}Mn_{0.01}Mg_{0.01}O_2$ was synthesized in the same way as sample 1, except using manganese oxide in place of aluminum oxide and mixing lithium carbonate, cobalt oxide, manganese oxide and magnesium carbonate to a Li:Co:Mn:Mg molar ratio of 1.02:0.98:0.01:0.01

Using this $LiCo_{0.98}Mn_{0.01}Mg_{0.01}O_2$ as the positive electrode active material, a cylindrically-shaped non-aqueous electrolyte cell was prepared in the same way as sample 1.

Sample 29

$LiCo_{0.98}Fe_{0.01}Mg_{0.01}O_2$ was synthesized in the same way as sample 1, except using iron oxide in place of aluminum oxide and mixing lithium carbonate, cobalt oxide, iron oxide and magnesium carbonate to a Li:Co:Cr:Mg molar ratio of 1.02:0.98:0.01:0.01.

Using this $LiCo_{0.98}Fe_{0.01}Mg_{0.01}O_2$ as the positive electrode active material, a cylindrically-shaped non-aqueous electrolyte cell was prepared in the same way as sample 1.

The initial capacity, initial efficiency and the 100 cycle volumetric upkeep ratio at 23° C. and at 50° C. for the samples 27 to 29 are shown along with the proportions of the Al, Cr, V, Mn, Fe or Mg in Table 5:

TABLE 5

|  | y | z | initial capacity (mAh) | initial efficiency (%) | volumetric upkeep ratio (%) at 23° C. 100 cycles (%) | volumetric upkeep ratio (%) at 50° C. 100 cycles (%) |
| --- | --- | --- | --- | --- | --- | --- |
| sample 27 | V: 0.010 | Mg: 0.010 | 1680 | 94.9 | 95.0 | 78.8 |
| sample 28 | Mn: 0.010 | Mg: 0.010 | 1680 | 94.9 | 95.1 | 78.6 |
| sample 29 | Fe: 0.010 | Mg: 0.010 | 1690 | 94.8 | 94.8 | 78.7 |
| sample 2 | Al: 0.010 | Mg: 0.010 | 1700 | 95.0 | 95.3 | 81.8 |
| sample 16 | Cr: 0.010 | Mg: 0.010 | 1720 | 94.8 | 95.1 | 80.0 |
| sample 8 | 0.000 | 0.000 | 1710 | 95.0 | 93.2 | 72.1 |

In the above Table 5, the results of evaluation of the cells of the samples 16 and 8 are also shown.

As may be seen from Table 5, the volumetric upkeep ratio is improved in the samples 2, 16 and 27 to 29 in which Al, Cr, V, Mn or Fe and Mg are substituted for part of Co are improved in the volumetric upkeep ratio, as compared to that of the sample 8 with no substitution for Co, thus testifying to improved cyclic characteristics at ambient and elevated temperatures. It is noted that the effect in improving the cyclic characteristics at elevated temperatures is manifested most significantly in the samples 2 and 16 employing Al or Cr, thus indicating that Al or Cr is most desirable as substitution element.

Examination for Starting Raw Materials for Positive Electrode Active Materials

In the following samples 30 and 31, positive electrode active materials were prepared using different starting raw materials. Then, using these positive electrode active materials, non-aqueous electrolyte cells were prepared, and evaluation was made of cell characteristics thereof Sample 30

$LiCo_{0.98}Al_{0.01}Mg_{0.01}O_2$ were synthesized in the same way as sample 1, except using magnesium oxide in place of magnesium carbonate.

Using this $LiCo_{0.98}Al_{0.01}Mg_{0.01}O_2$ as a positive electrode active material, a cylindrically-shaped non-aqueous electrolyte cell was prepared in the same way as in sample 1.

Sample 31

$LiCo_{0.98}Al_{0.01}Ca_{0.01}O_2$ were synthesized in the same way as sample 1, except using calcium oxide in place of magnesium carbonate.

Using this $LiCo_{0.98}Al_{0.01}Ca_{0.01}O_2$ as a positive electrode active material, a cylindrically-shaped non-aqueous electrolyte cell was prepared in the same way as in sample 1.

The initial capacity, initial efficiency and the 100 cycle volumetric upkeep ratio at 23° C. and at 50° C. for the samples 30 and 31 are shown along with starting raw materials for synthesis of the positive electrode active materials in Table 6:

TABLE 6

| | starting materials for positive electrode active material | initial capacity (mAh) | initial efficiency (%) | volumetric upkeep ratio at 23° C. 100 cycles (%) | volumetric upkeep ratio at 50° C. 100 cycles (%) |
|---|---|---|---|---|---|
| sample 30 | magnesium oxide | 1670 | 94.8 | 93.8 | 74.3 |
| sample 2 | magnesium carbonate | 1700 | 95.0 | 95.3 | 81.8 |
| sample 31 | calcium oxide | 1670 | 94.5 | 94.0 | 74.1 |
| sample 22 | calcium oxide | 1680 | 94.9 | 95.1 | 80.2 |
| sample 8 | — | 1710 | 95.0 | 93.2 | 72.1 |

In Table 6, the results or evaluation on the cells of the samples 2, 22 and 8 are also shown.

As may be seen from Table 6, no sufficient effect in improving cyclic characteristics is demonstrated in the samples 30 and 31, employing oxides as sources of Mg and Ca, in comparison with the samples 2 and 22 employing corresponding carbonates. It is thus seen that carbonates are most desirable as starting raw materials for the positive electrode active material, in particular Mg and Ca sources.

What is claimed is:

1. A method for the preparation of a positive electrode active material comprising the steps of:
   (a) mixing a cobalt compound, a lithium compound, a compound of at least one element selected from the group consisting of aluminum, chromium, vanadium, manganese and iron and a compound of at least one element selected from the group consisting of magnesium and calcium, at a pre-set ratio; and
   (b) sintering a mixture from the mixing step to produce a compound represented by the general formula $LiCo_x\text{-}A_yB_zO_2$ where A denotes at least one element selected from the group consisting of Al, Cr, V, Mn and Fe, and B denotes at least one element selected from the group consisting of Mg and Ca, and x, y and z are such that $0.9 \leq x < 1$, $0.001 \leq y \leq 0.05$, and $0.001 \leq z \leq 0.05$;
   the compound of at least one element selected from the group selected from the group consisting of magnesium and calcium, as used in the mixing step, being magnesium carbonate or calcium carbonate.

2. A method for the preparation of a non-aqueous electrolyte secondary cell comprising a positive electrode, a negative electrode, and a non-aqueous electrolyte interposed between the positive and negative electrodes, comprising, in producing the positive electrode, the steps of:
   (a) mixing a cobalt compound, a lithium compound, a compound of at least one element selected from the group consisting of aluminum, chromium, vanadium, manganese and iron and a compound of at least one element selected from the group consisting of magnesium and calcium, at a pre-set ratio; and
   (b) sintering a mixture from the mixing step to produce a compound represented by the general formula $LiCo_x\text{-}A_yB_zO_2$ where A denotes at least one element selected from the group consisting of Al, Cr, V, Mn and Fe, and B denotes at least one element selected from the group consisting of Mg and Ca, and x, y and z are such that $0.90 \leq x < 1$, and $0.001 \leq y \leq 0.05$, and $0.001 \leq z \leq 0.05$; and the compound of at least one element selected from the group consisting of magnesium and calcium, as used in the mixing step, being magnesium carbonate or calcium carbonate.

3. The method according to claim 2, wherein the negative electrode contains an active material capable of doping/undoping lithium ions; the active material is selected from the group consisting of a carbonaceous material and a polymer including polyacetylene polymer.

4. The method according to claim 3, wherein the negative electrode comprises carbonaceous material which is selected from the group consisting of a pyrocarbon, pitch coke, needle coke, petroleum coke, graphites, vitreous carbon fibers, sintered organic high polymer compounds, carbon fiber, and activated charcoal.

5. The method according to claim 3, wherein the negative electrode is a material that can be alloyed with lithium and includes a compound represented by a chemical formula $M_xM'_yLi_z$ where M is an element of the group 3A or a metal other than the group 4A excluding carbon, M' is one or more metal element other than the element Li and the element M, x is a numerical value larger than 0, and y, z are numerical values greater than 0.

6. The method according to claim 2 wherein the electrode is a band-shaped positive electrode coated with a positive electrode mixture containing the positive electrode active material on both surfaces of a metal foil, and a band-shaped negative electrode coated with a negative electrode mixture containing the negative electrode active material on both surfaces of a metal foil, the positive electrode and the negative electrode being stacked and wound spirally by interposing a separator in-between.

7. The method according to claim 2, wherein the electrolyte is a solution of an electrolyte in a non-protonic non-aqueous solvent.

8. The method according to claim 7, wherein the electrolyte is a solution of a mixture of one or more selected from cyclic carbonates or chained carbonates.

9. The method according to claim 7, wherein the electrolyte uses, as the cyclic carbonate, a solvent selected from the group consisting of ethylene carbonate, propylene carbonate, butylene carbonate, vinylene carbonate and gamma butyrolactone, the electrolyte using, as the chained carbonate, a solvent selected from the group consisting of dimethyl carbonate, diethyl carbonate, and dipropyl carbonate.

10. The method according to claim 7, wherein electrolyte comprises one of the inorganic solid electrolyte and a high molecular solid electrolyte as material exhibiting lithium ion conductivity.

11. The according to claim 7, wherein the electrolyte comprises one or more lithium salts selected from the group consisting of LiCl, LiBr, $LiPF_6$, $LiClO_4$, $LiAsF_6$, $LiBF_4$, $LiCH_3SO_3$, $LiCF_3SO_3$, $LiN(CF_3SO_2)_2$ or $LiB(C_6H_5)_4$.

* * * * *